(No Model.)  2 Sheets—Sheet 1.
J. G. BARBER.
GATE.
No. 432,354.  Patented July 15, 1890.
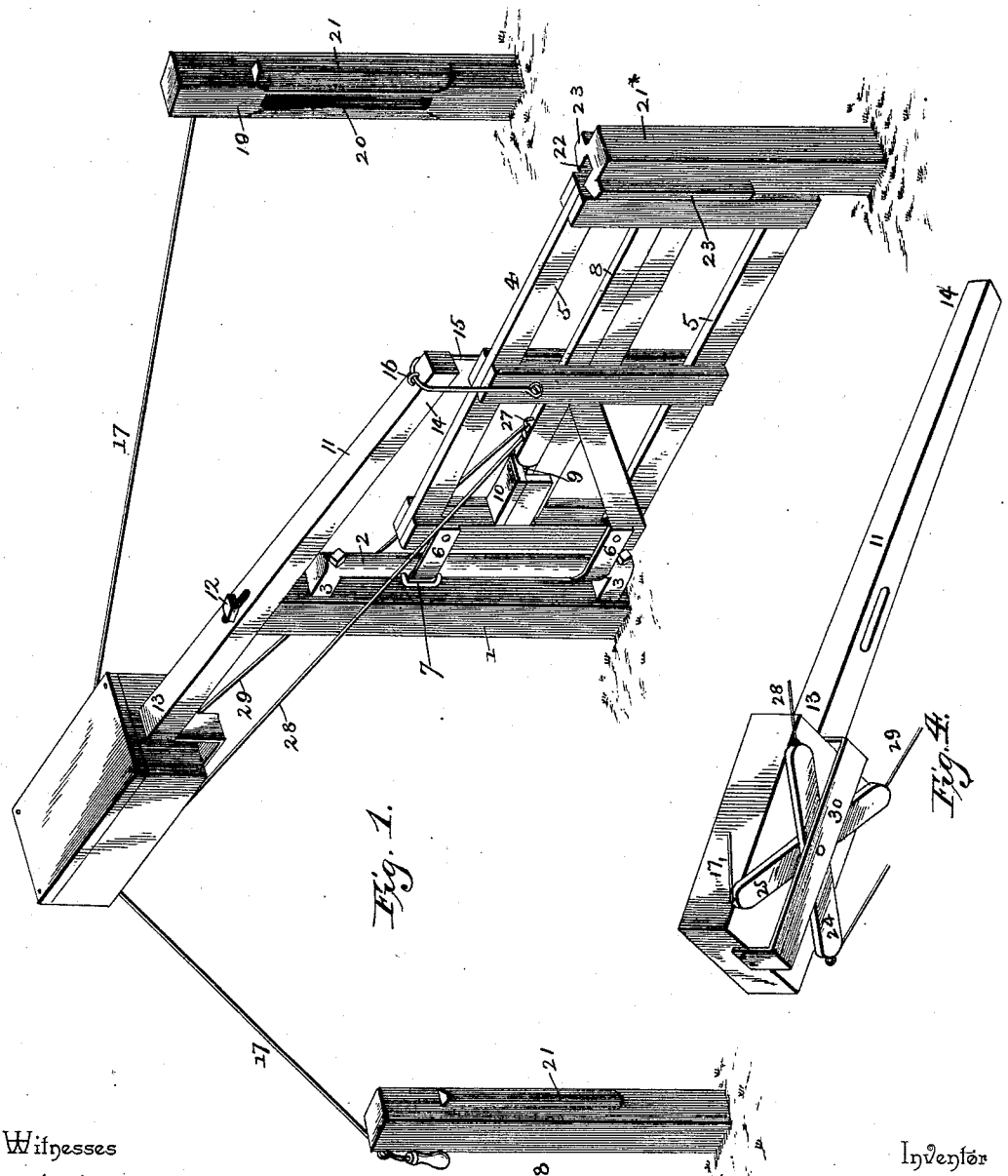
Witnesses
F. L. Ourand
H. F. Riley
By his Attorneys,
C. A. Snow & Co.
Inventor
Joseph G. Barber.

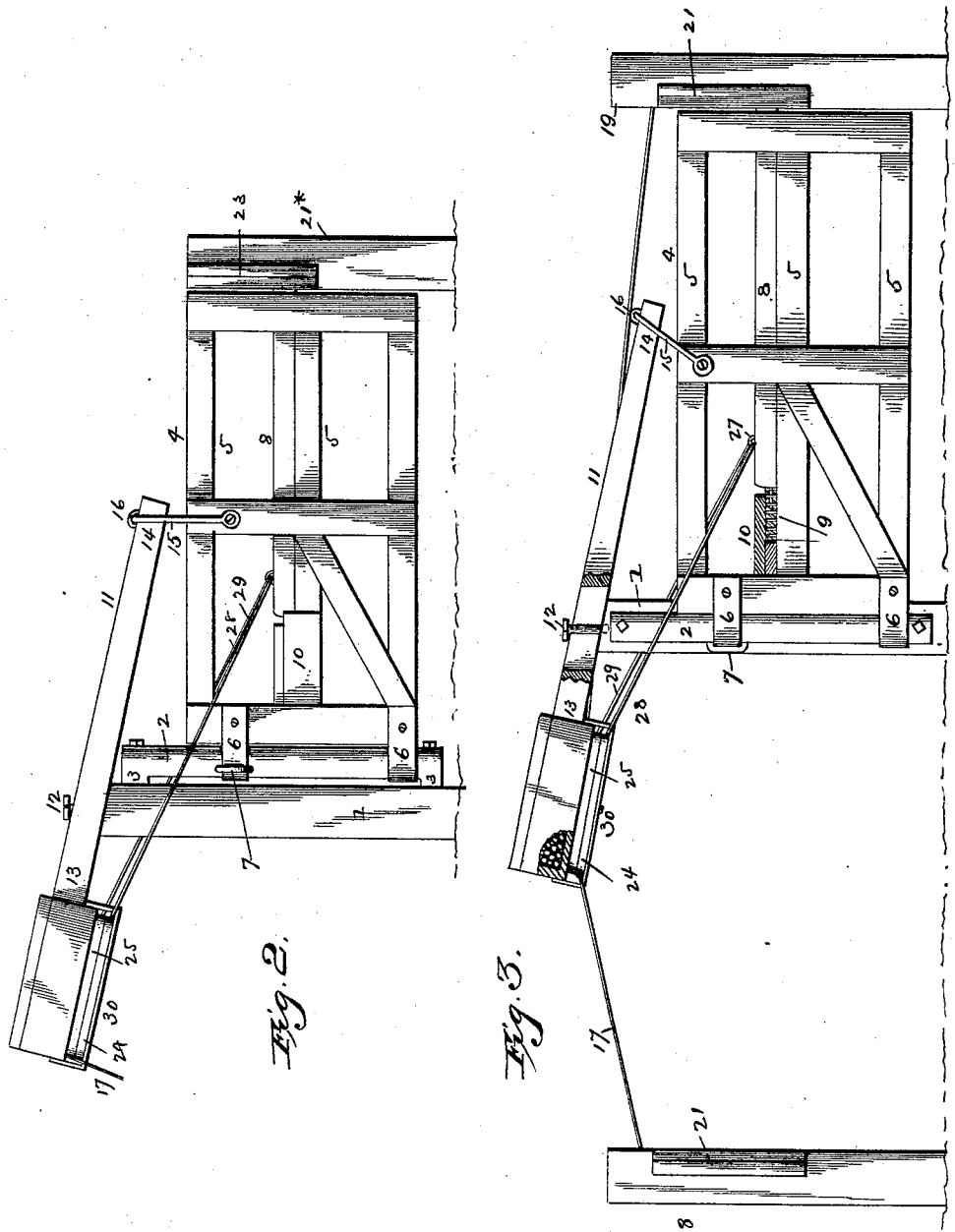

UNITED STATES PATENT OFFICE.

JOSEPH G. BARBER, OF BRODHEAD, WISCONSIN.

GATE.

SPECIFICATION forming part of Letters Patent No. 432,354, dated July 15, 1890.

Application filed February 12, 1890. Serial No. 340,090. (No model.)

*To all whom it may concern:*

Be it known that I, JOSEPH G. BARBER, a citizen of the United States, residing at Brodhead, in the county of Green and State of Wisconsin, have invented a new and useful Gate, of which the following is a specification.

The invention relates to improvements in gates.

The object of the present invention is to provide a gate of simple and comparatively inexpensive construction, adapted to be readily opened without the necessity of dismounting from a horse or leaving a vehicle and capable of being securely held in its open and closed positions and of being automatically released therefrom when operated to return it from one position to the other.

The invention consists in the construction and novel combination and arrangement of parts hereinafter fully described, illustrated in the accompanying drawings, and pointed out in the claims hereto appended.

In the drawings, Figure 1 is a perspective view of a gate and operating mechanism constructed in accordance with this invention. Fig. 2 is a side elevation of a gate, the latter being in its closed position. Fig. 3 is a side elevation of a gate in its open position. Fig. 4 is a detail perspective view of the weighted lever and the latch-operating levers.

Referring to the accompanying drawings, 1 designates a hinge-post, to the front side of which is secured a vertical rod 2, that is provided at its ends with shoulders 3, through which pass bolts or the like to secure the vertical rod 2 in position. A gate 4, constructed in the usual manner and composed of vertical end and center bars and horizontal rails 5, is hinged to the vertical rod 2 by means of straps 6, that embrace the said rod, and the said gate is prevented from rising upon the said rod by a staple 7, whose legs are arranged above and below the upper strap 6 and limit the movement thereof. The gate 4 is provided with a spring-actuated latch-bar 8, that is arranged above and slides upon the middle rail, and is normally held in an extended position by a spring 9, arranged at the rear of the bar 8 and housed in a suitable casing 10, the sides of which depend below the upper edge of the horizontal bar and are secured to the sides thereof.

The gate is counterbalanced and rendered easy to operate by a lever 11, which is loosely pivoted upon the top of the hinge-post 1 by a pin 12. The outer end 13, which extends rearwardly beyond the hinge-post, is weighted or provided with a suitable box to receive a weight, and the inner end 14 is connected to the upper ends of the center bars by a keeper 15, that passes through a staple 16 near the end of the lever and has its ends bent upon themselves and formed into eyes to receive screws or the like.

The gate is controlled by an operating-rope 17, that is connected at its ends with the rear weighted end 13 of the lever and passes around posts 18 and 19, arranged equidistant from the hinge-post 1, and provided upon their opposed faces with longitudinal slots or recesses 20 for the reception of the latch-bar 8 to retain the gate in its open position. The said posts 18 and 19 are provided with strips 21, which are secured upon corresponding sides thereof, and are, together with the adjacent faces of the post, beveled in order to compress the spring 9 and allow the latch-bar 8 to enter the recesses 20. A latch-post 21* is arranged opposite the hinge-post, and is provided with a longitudinal recess 22, similar to the recesses 20 of the posts 18 and 19, and both sides of the latch-post are beveled and provided with strips 23 to adapt the gate to be opened and closed upon either side. The latch is operated by levers 24 and 25, which are pivoted centrally together and to the lower face of the weighted end or box 13 of the lever, and are arranged at right angles to each other and approximately form an X. The ends of the latch-operating levers 24 and 25 are provided with eyes or staples 26, and they have their rearwardly-extending ends secured to the ends of the gate-operating rope 17, and their other ends are connected with the latch-bar 8, which is provided upon its upper face with an eye or staple 27 by means of ropes or cords 28 and 29, arranged at each side of the gate and to the staple 27. When the operating-cord 17 is pulled from either direction to open or close the gate, one of the levers will have its end to which the latch-cord is attached drawn rearwardly, the gate thereby pulling back the latch-bar and compressing the spring 9 and withdrawing the said latch-bar from engagement with the longitudinal recess of the adjacent post and releasing the gate. When the gate reaches the post toward which it is traveling, the said cord, that is connected to the latch-bar, is slackened and the latch-bar is allowed to resume its normal position and engage the longitudinal slot. It will readily be seen that the gate is easily operated and may be readily opened upon either side of the latch-bar without dismounting from an animal or leaving a vehicle. The latch-operating levers are secured in place by a keeper or strap 30, that extends beneath the levers and has its ends suitably secured to the weighted lever or to the box at the rear end thereof for receiving a weight.

The operating-rope which controls the gate may be continuous and extend around the posts 18 and 19; but it is preferable to employ two ropes and have their adjacent ends secured to the rearwardly-extending ends of the latch-operating levers and their free ends provided with suitable handles and arranged upon the sides of the posts 18 and 19, or on arms extending therefrom, in order that they may be within easy reach of the person desiring to open the gate.

What I claim is—

1. The combination of a post, a gate suitably hinged thereto and provided with a spring-actuated latch-bar, a weighted lever pivoted to said post and having one end connected to the gate, the X-shaped latch-operating levers pivoted beneath the weighted end of said lever and connected with the latch-bar, and the operating cord or rope, substantially as described.

2. The combination of a post, a gate suitably hinged thereto, the latch-bar sliding longitudinally along the gate, a spring arranged at the rear of the latch-bar and adapted to hold the latter normally extended, the casing 10, secured to the gate and forming a housing for the spring, a weighted lever pivoted to the post and having its front end connected to the gate, the latch-operating levers pivoted together and to the rear end of the weighted lever and arranged at an angle to each other, and having their ends provided with eyes, the cords 28 and 29, secured to the front ends of the latch-operating levers and connected to the latch-bar, and the operating-ropes secured to the eyes at the rear end of the levers, substantially as described.

In testimony that I claim the foregoing as my own I have hereto affixed my signature in presence of two witnesses.

JOSEPH G. BARBER.

Witnesses:
JOHN V. WARD,
JOSEPH THOMPSON.